United States Patent [19]
Kujirai

[11] Patent Number: 5,801,712
[45] Date of Patent: Sep. 1, 1998

[54] CHARACTER PROCESSING APPARATUS AND METHOD

[75] Inventor: Yasuhiro Kujirai, Tokyo, Japan

[73] Assignee: Canon Kabushiki Kaisha, Tokyo, Japan

[21] Appl. No.: 671,938

[22] Filed: Jun. 28, 1996

[30] Foreign Application Priority Data

Jun. 30, 1995 [JP] Japan .................. 7-165908

[51] Int. Cl.$^6$ .................................................. G06F 15/00
[52] U.S. Cl. .................................................. 345/471
[58] Field of Search .................. 345/467, 468, 345/469, 144, 470, 471, 472

[56] References Cited

U.S. PATENT DOCUMENTS 5,537,131  7/1996  Mitsuhashi et al. .................... 345/128
5,671,346  9/1997  Tamura et al. ......................... 395/171
5,724,073  3/1998  Hino et al. ............................. 345/441

*Primary Examiner*—Phu K. Nguyen
*Attorney, Agent, or Firm*—Fitzpatrick, Cella, Harper & Scinto

[57] ABSTRACT

A character processing apparatus using outline font that represents the shape of a character with outline coordinates, capable of determining an effective range for correcting the outline coordinates upon plotting outline coordinates, by each of a plurality of pre-stored line-width information. The apparatus control not to perform a plurality of high-quality processings at once, by correcting the outline coordinates in accordance with the line-width information within the effective range, thus maintains high-quality character shape after correction.

41 Claims, 18 Drawing Sheets

FIG. 5

| |
|---|
| offset value to horizontal line-width information table |
| offset value to vertical line-width information table |
| horizontal line-width information table |
| vertical line-width information table |

FIG. 6

| |
|---|
| number of line-width information |
| lowest coordinate value of first line width (LO) |
| highest coordinate value of first line width (HI) |
| minimum lowest coordinate value of first line width (LMIN) |
| maximum lowest coordinate value of first line width (LMAX) |
| minimum highest coordinate value of first line width (HMIN) |
| maximum highest coordinate value of first line width (HMAX) |
| ≈ ≈ |
| lowest coordinate value of m-th line width |
| highest coordinate value of m-th line wdth |
| minimum lowest coordinate value of m-th line width |
| maximum lowest coordinate value of m-th line width |
| minimum highest coordinate value of m-th line width |
| maximum highest coordinate value of m-th line width |

FIG. 8

| outline-coordinate value | | attribute | line-width information flag | | | | | | |
|---|---|---|---|---|---|---|---|---|---|
| | | | HCOUNT | | | VCOUNT | | | |
| x(1) | y(1) | attribute (1) | 0 | 0 | 0 | 0 | 0 | 0 | 0 |
| x(2) | y(2) | attribute (2) | 0 | 1 | 0 | 1 | 0 | 0 | 0 |
| x(3) | y(3) | attribute (3) | 0 | 1 | 0 | 1 | 0 | 0 | 0 |
| x(n−2) | y(n−2) | attribute (n−2) | 0 | 1 | 0 | 0 | 0 | 0 | 0 |
| x(n−1) | y(n−1) | attribute (n−1) | 0 | 0 | 0 | 0 | 0 | 1 | 1 |
| x(n) | y(n) | attribute (n) | 1 | 0 | 0 | 0 | 0 | 0 | 1 | number of control points : n

FIG. 16

| command | usage | function |
|---|---|---|
| hlineto | dx hlineto | drawing of horizontal straight line |
| hmoveto | dx1 hmoveto | horizontal movement |
| hvcurveto | dx1 dx2 dy2 dx3 hvcurveto | drawing of horizontal-vertical curved line |
| rlineto | dx dy rlineto | drawing of straight line |
| rmoveto | dx dy rmoveto | movement |
| rrcurveto | dx1 dy1 dx2 dy2 dx3 dy3 rrcurveto | drawing of curved line |
| vhcurveto | dy1 dx2 dy2 dx3 vhcurveto | drawing of vertical-hoizontal curved line |
| vlineto | dy vlineto | drawing of vertical line |
| vmoveto | dy vmoveto | vertical movement |
| closepath | closepath | declare terminal of outline |
| endglyph | endglyph | declare end of character drawing |
| xrpe | rpx ex xrpe | command to set reference point and wind |

CHARACTER PROCESSING APPARATUS AND METHOD

BACKGROUND OF THE INVENTION

This invention relates to a character processing apparatus and method and, more particularly to a character processing apparatus and method using outline font which represents the shape of a character with coordinates of the outline of the character.

To maintain high quality of character shape upon bitmapping character data (outline font data) encoded in outline format, conventional character processing apparatuses save outline-coordinate correction information to correct outline coordinates as well as outline-coordinate information of the outline font data.

However, upon plotting based on the outline-coordinate information, the conventional character processing apparatuses may fail to perform a plurality of high-quality processings, corresponding to a plurality or items in the outline-coordinate correction information, with respect to the same area at once. This may occur in a case, for example, where a plurality of correction processing are to be performed on lines of different widths in the same direction, in which the lines have coordinate values different from each other, and the lines are overlapped at some portion. In this case, if a plurality of such high-quality processings, which are impractical in simultaneous use, are intended to be performed on the same area at the same time, desired processing results to maintain character shape in high quality cannot be obtained, resulting in the character quality being degraded.

The outline-coordinate correction information in the conventional character processing apparatuses is stored with no connection with the order of plotting based on the outline-coordinate information. That is, the correction information is merely concerned with relative position information at each coordinate point, and the amount of data is not small.

SUMMARY OF THE INVENTION

Accordingly, it is an object of the present invention to provide a character processing apparatus and method capable of maintaining character shape based on outline font in high quality.

According to the present invention, the foregoing object is attained by providing an image processing apparatus comprising a character processing apparatus using outline font that represents a shape of a character with outline coordinates, comprising: coordinate reading means for reading the outline coordinates; effective-range determination means for determining an effective range, allowing correction on the outline coordinates, in a plurality of correction information; and correction means for correcting the outline coordinates, in accordance with correction information within the effective range determined by the effective-range determination means.

In accordance with the present invention as described above, the apparatus determines an effective range to which the outline-coordinate correction information is applied, so as not to simultaneously perform a plurality of high-quality processings which are impractical in simultaneous use.

It is another object of the present invention to provide a character processing apparatus and method capable of reducing the amount of outline-coordinate correction information.

According to the present invention, foregoing object is attained by providing an image processing apparatus comprising the character processing apparatus having the above construction, wherein the outline coordinates indicate an intermediate point of a Bezier curved line.

In accordance with the present invention as described above, the outline-coordinate correction information is represented as an effective range in outline coordinates, thus reducing the amount of data to be maintained.

The present invention is particularly advantageous since an effective range to which the outline-coordinate correction information is applied is determined, and correction is performed within the effective range, so that a plurality of high-quality processings impractical in simultaneous use are not performed simultaneously. This maintains the shape of corrected character in high quality.

Further, the effective correction information of the outline coordinates can be outputted as less amount of data. This improves effective use of memory.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing the data structure of correction information in the first embodiment;

FIG. 6 is a table showing the data structure of line-width information in the first embodiment;

FIG. 8 is a table showing output format of an effective range in the first embodiment;

FIG. 16 is a table showing representative JISX4163 commands in a third embodiment of the present invention;

DETAILED DESCRIPTION OF THE PREFERRED EMBODIMENTS

Preferred embodiments of the present invention will now be described in detail in accordance with the accompanying drawings.

<First Embodiment>

Figure 1:
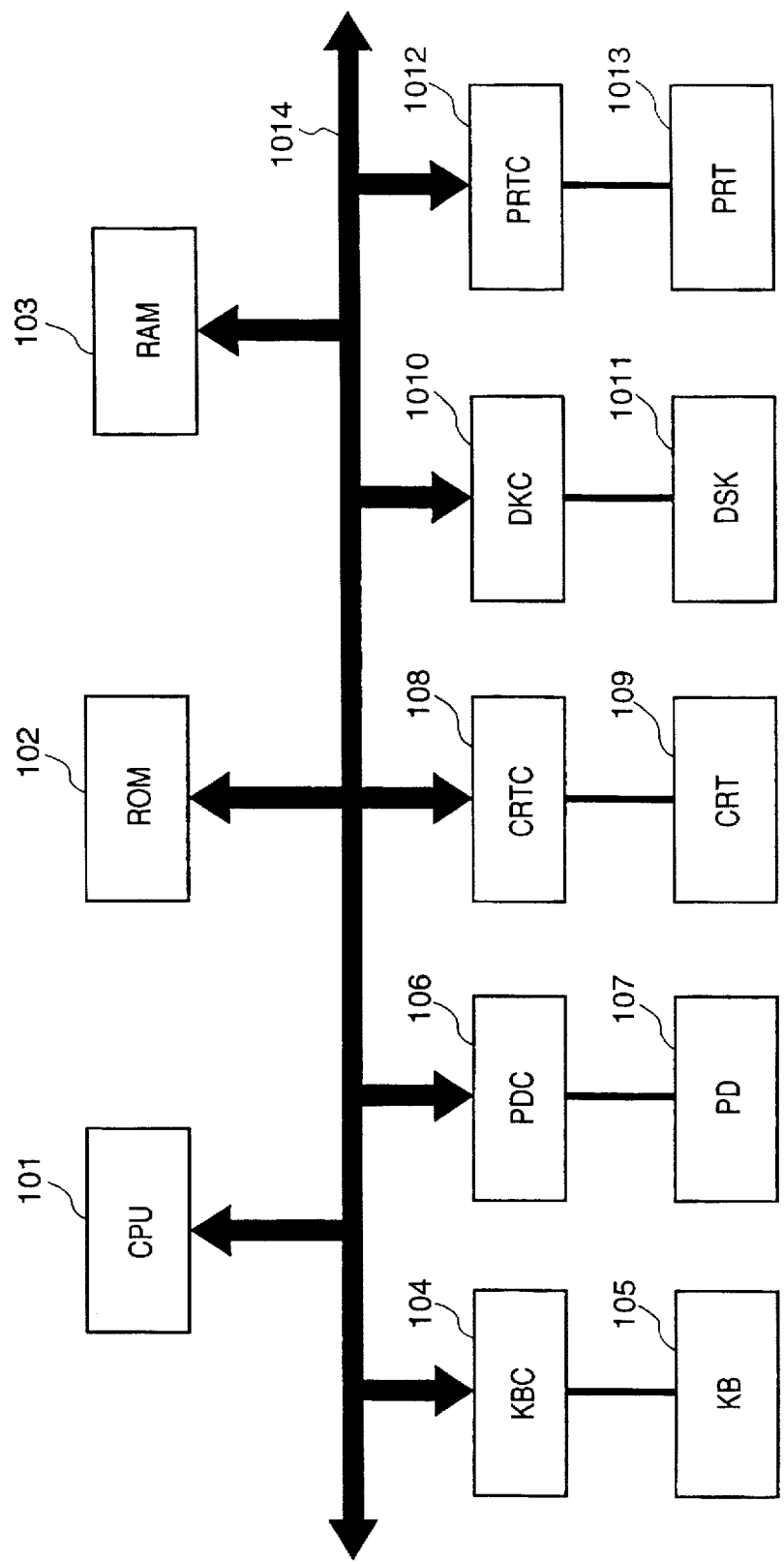
FIG. 1 is a block diagram schematically showing the construction of a character processing apparatus according to a first embodiment of the present invention.

FIG. 1 is a block diagram schematically showing the construction of a character processing apparatus according to a first embodiment of the present invention. The character processing apparatus may be a word processor or an electronic typewriter, otherwise, it may be a printer such as an ink-jet printer or a laser-beam printer, otherwise, it may be a workstation or a computer system.

In FIG. 1, reference numeral 101 denotes a central processing unit (CPU) which controls the overall character processing apparatus and performs calculation processings. Numeral 102 denotes a read-only memory (ROM) which is used as a storage area for storing system control programs, character pattern data and the like. The processings shown in the respective flowcharts to be described later are stored in the ROM 102 as control programs and executed by the CPU 101. Numeral 103 denotes a random-access memory (RAM) which is used for loading various programs (including the programs of the flowcharts to be described later) and data for various processings, as a data storage area with no limitation of use. Variables and the like used in the present embodiment are ensured on the RAM 103.

Numeral 104 denotes a keyboard controller (KBC) which receives key-input data from a keyboard (KB) 105 and transfers the received data to the CPU 101; 106, a pointing-device controller (PDC) which receives coordinate data, key-input data and the like from a pointing device (PD) 107 and transfers the received data to the CPU 101; and 108, a display controller (CRTC) which outputs data to be displayed to a display (CRT) 109. The display (CRT) 109, comprising a display device such as a CRT, receives data from the CRTC 108 and displays the data.

Numeral 1011 denotes an external storage (disk: DSK) which is a floppy disk (FD) or a hard disk (HD) for storing programs and data, to be referred to or loaded to the RAM 103, in accordance with necessity upon execution; 1010, a disk controller (DKC) which controls data transfer and the like between the DSK 1011; and 1012, a printer controller (PRTC) which controls a printer (PRT) 1013. The PRT 1013 receives data from the PRTC 1012 and performs printing on a printing medium. Numeral 1014 denotes a system bus which serves as a data path among the above constituents.

Figure 2:
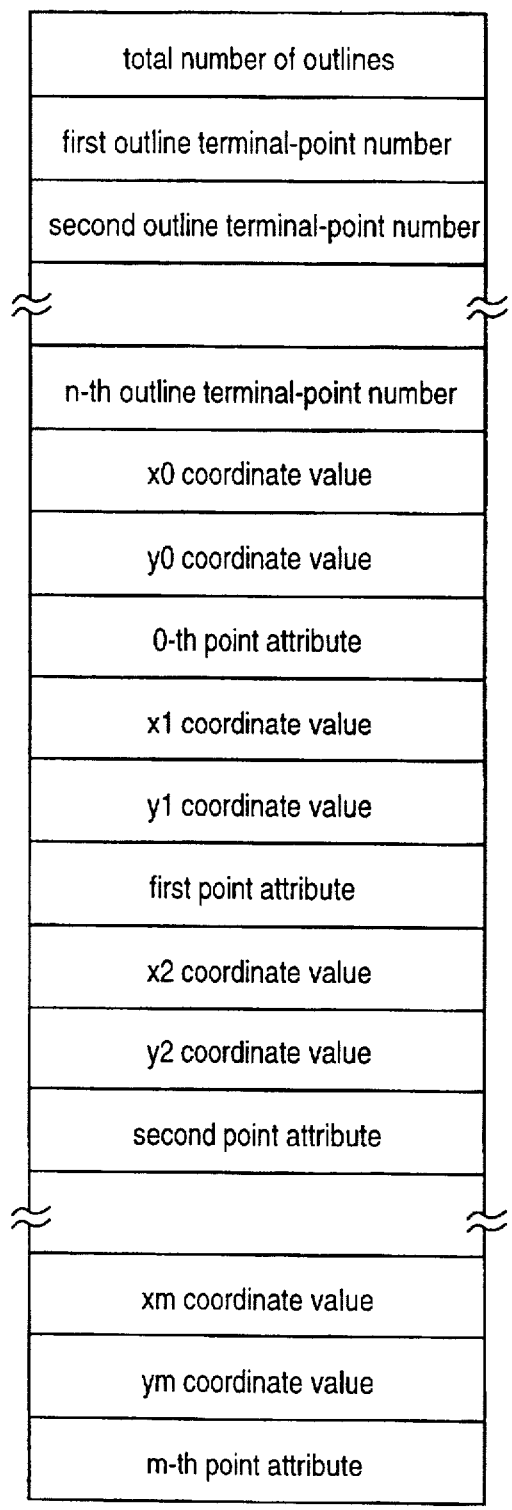
FIG. 2 is a table showing the data structure of outline-coordinate information in the first embodiment.

The character processing apparatus of the present embodiment having the above construction uses outline font that represents character shapes with outline coordinates. FIG. 2 shows the data structure of outline-coordinate information of the outline font used in this embodiment.

Figure 3:
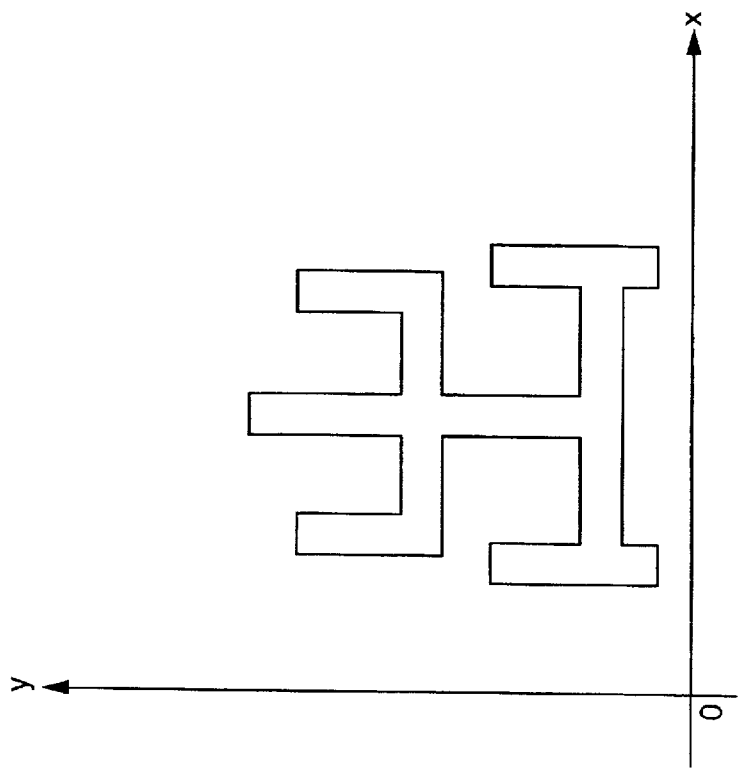
FIG. 3 is an explanatory view showing a two-dimensional plane coordinate system in the first embodiment.

As shown in FIG. 2, the outline-coordinate information of the present embodiment includes the total number of outlines and terminal-point numbers of respective outlines. Also, the outline-coordinate information includes, by each control point, an x-coordinate value, a y-coordinate value and a point attribute data which indicates whether the control point is an end point or an intermediate point on a three-dimensional Bezier curved line. Note that the present embodiment employs a two-dimensional plane coordinate system as shown in FIG. 3, where the origin is located at a lower-left position. In the two-dimensional plane coordinate system of FIG. 3, the direction X represents a horizontal direction; the direction Y, a vertical direction.

Figure 4:
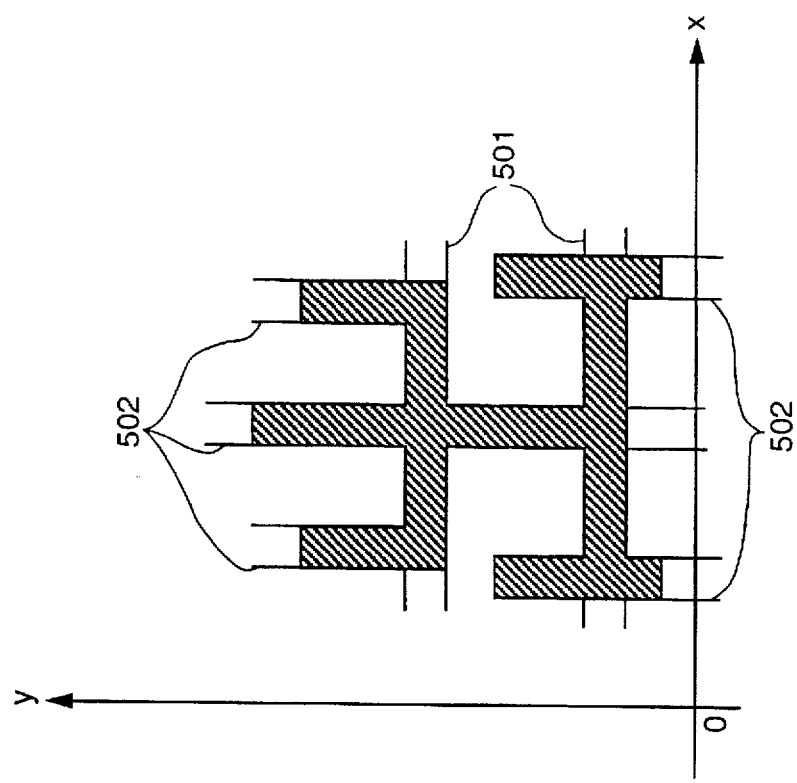
FIG. 4 is an explanatory view showing the example of line width information in the first embodiment.

FIG. 4 shows an example of line width according to the present embodiment. In FIG. 4, numeral 501 denotes a line width in the horizontal direction (referred to as "horizontal line width"); and 502, line width in the vertical direction (referred to as "vertical line width"). The correction on these line-widths is made based on character-outline correction information maintained in a line-width information table as shown in FIG. 5. Hereinafter, this character-outline correction information will be referred to as "line-width information". The CPU 101 interprets a command inputted by using the KB 105, the PD 107 or the like, and it refers to the line-width information based on the interpretation.

The line-width information table in FIG. 5 is stored, by type, in the ROM 102 in advance. It has a horizontal line-width information table and a vertical line-width information table, and has an offset value to the horizontal line-width information table and an offset value to the vertical line-width information table at the top of the table. Note that horizontal and vertical line-width information designated by the respective offset values have the same data structure. If there is no horizontal or vertical line-width information, the offset values to the corresponding line-width information table is set to "0".

FIG. 6 shows the data structure of the above-described line-width information table. At the head of the horizontal line-width information table, information HCOUNT indicates the number of horizontal line-width information stored; similarly, at the head of the vertical line-width information table, information VCOUNT indicates the number of vertical line-width information stored. The respective line-width information tables have a lowest coordinate value LO, a highest coordinate value HI, minimum and maximum coordinate values of a control points of the line width, LMIN, LMAX, HMIN, HMAX, and the number of these values corresponds to the number indicated by the information HCOUNT or VCOUNT.

For example, on the assumption that the horizontal direction is represented by the direction X, the vertical direction, by the direction Y, the values LO and HI of horizontal line-width information are represented by Y-coordinate values, and the values LMIN, LMAX, HMIN, HMAX, by X-coordinate values. In case of vertical line-width information, the values LO and HI are represented by X-coordinate values, and the values LMIN, LMAX, HMIN, HMAX, by Y-coordinate values.

As described above, in the present embodiment, line-width correction on outline font is performed in accordance with the line-width information as shown in FIG. 6.

Figure 7:
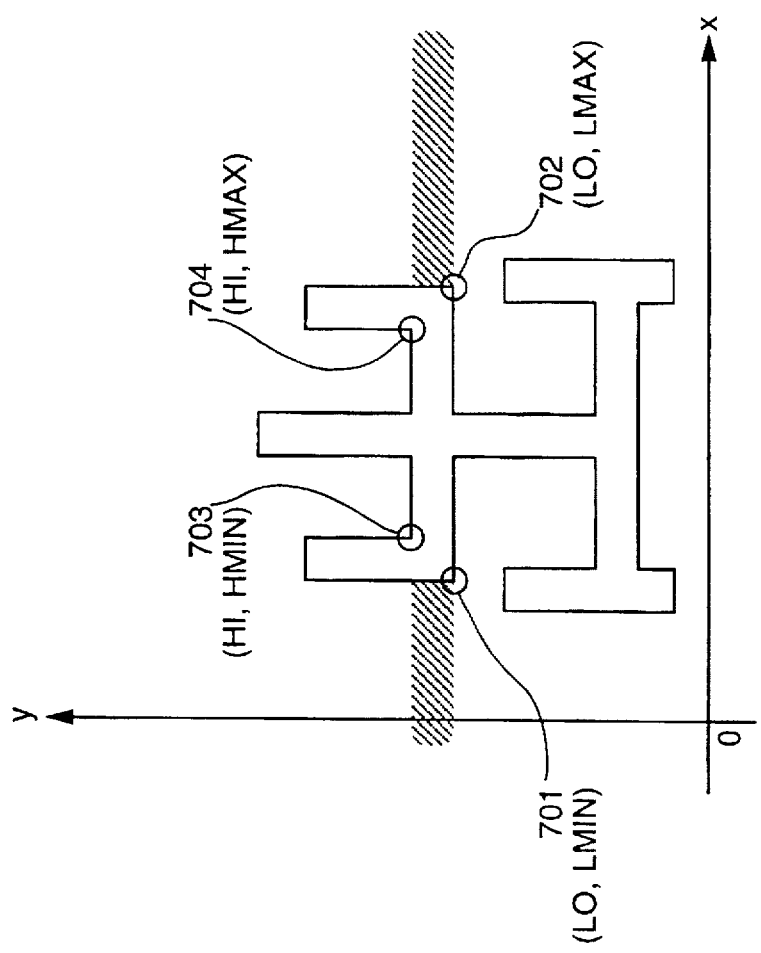
FIG. 7 is an explanatory view showing variables maintained in the line-width information in the first embodiment.

Next, respective variables included in the line-width information in FIG. 6 will be further described with reference to FIG. 7. The respective coordinate values correspond to a horizontal line width hatched in FIG. 7. That is, a point 701 has the lowest coordinate value LO in a line-width direction (vertical direction: direction Y), and the minimum coordinate value LMIN in a line-width lengthwise direction (horizontal direction: direction X) as the lowest left control point. Accordingly, the point 701 is represented by the coordinates (y,x)=(LO, LMIN). Similarly, a point 702 is represented by (LO, LMAX); a point 703, by (HI, HMIN); and a point 704, by (HI, HMAX).

In the present embodiment, when a line-width is corrected in accordance with line-width information, to avoid performing a plurality of corrections on the same outline in accordance with a plurality of line-width information, an effective range of outline is determined as the object of correction.

Next, an algorithm to determine character outline-coordinate correction information, i.e., an effective range of line-width information correction information will be outlined.

In the present embodiment, a range of outline-coordinate values, within which respective correction information are effective, is determined by using the aforementioned outline-coordinate information in FIG. 2 and line-width information in FIG. 6 as inputs. Then, the determined effective range is outputted as a data array as shown in FIG. 8 to, e.g., a predetermined area of the RAM 103.

FIG. 8 shows the effective range of line-width information, determined in the present embodiment. In FIG. 8, the effective range information is given as a flag array, with respect to each of n control points (including their coordinate values and point attribute information) as shown in FIG. 2, by horizontal/vertical line-width information as shown in FIG. 6. In the effective range, each flag values set to indicate whether the object line width is effective or not.

In the present embodiment, when the outline-coordinate information is sequentially read and outline is plotted based on the read outline coordinate information, each time a line is plotted, the corresponding line-width information is detected. The corresponding line-width information is the two-dimensional vector between two continuous outline-coordinate values upon plotting which is a part or all of a line segment connecting the minimum lowest coordinate value LMIN and the maximum lowest coordinate value LMAX of some line-width information, otherwise, a part or all of a line segment connecting the minimum highest coordinate value HMIN and the maximum highest coordinate value HMAX of the line-width information.

In the present embodiment, an effective range of line-width information as shown in FIG. 8 is detected as follows. With respect to a line segment having start point P(1) and an end point P(2) of two continuous outline-coordinate values, if corresponding line-width information is detected, the detection result is projected on the line-width information flag of the start point P(1). Thus, before the point P(1) is plotted, the corresponding line-width information of the start point P(1) can be transferred to plotting process.

Further, if the start point P(1) is the initial point of the outline, the start point P(1) is in connection with a terminal point P(L) of the outline. In this case, to project line-width information corresponding to a line segment having the two points P(1) and P(L) on the line-width information flags of the initial point P(1), "initial-point processing" of the outline is performed by modification to the flags or the like. Similarly, to project line-width information corresponding to a line segment having two points P(1) and P(2) on the line-width information flags of the terminal point P(L), "terminal-point processing" of the outline is performed. These initial-point processing and terminal-point processing will be described later.

Next, the algorithm to determine the effective range of character outline-coordinate correction information according to the present embodiment will be described in detail with reference to the flowcharts in FIGS. 9 and 10. Note that the algorithm shown in FIGS. 9 and 10 corresponds to the flow of plotting processing of a character.

Figure 9:
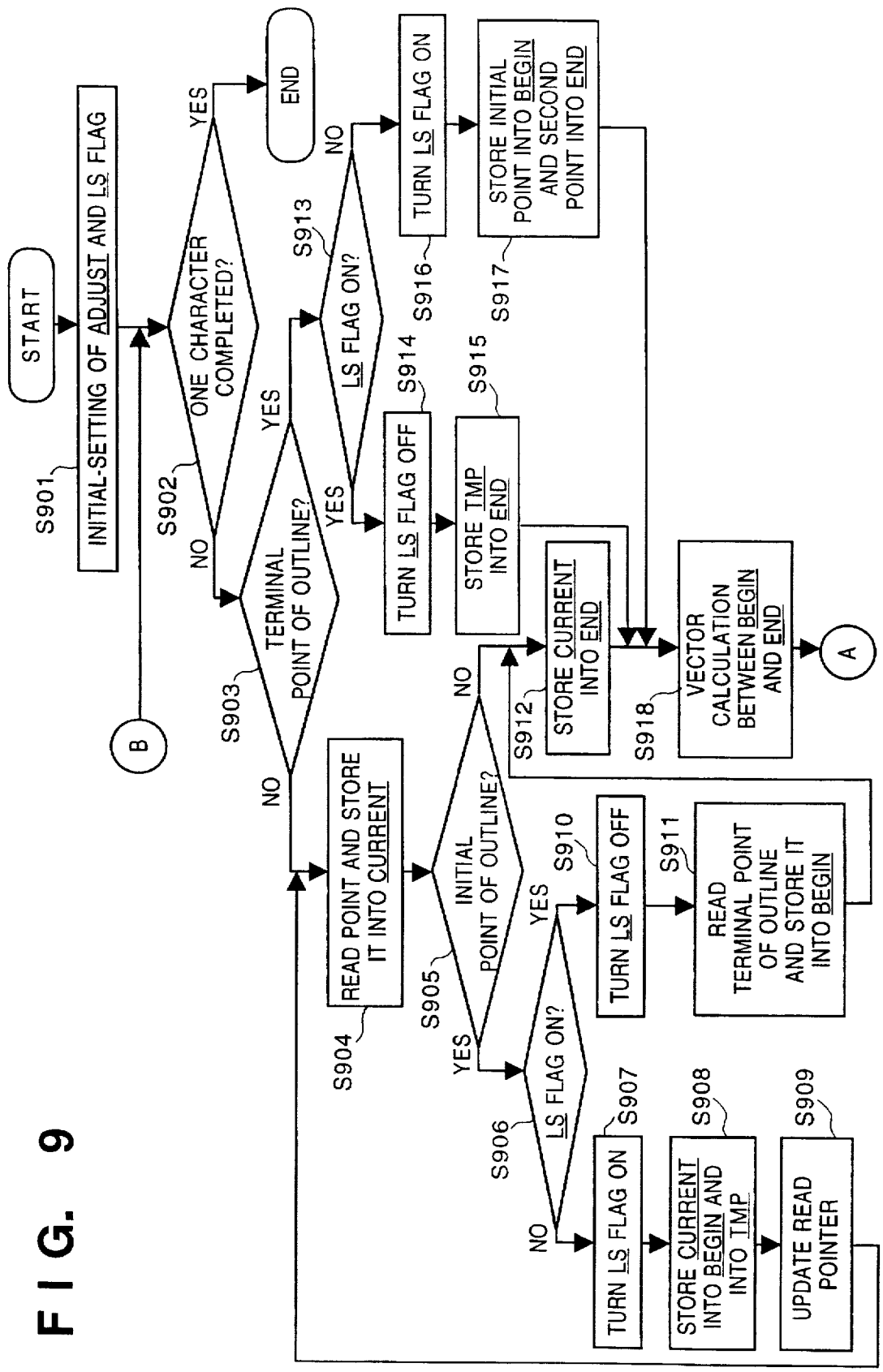
FIGS. 9 and 10 are flowcharts showing effective-range determination processing according to the first embodiment.

In FIG. 9, as initial setting, the flags of a working flag array ADJUST which indicates effective line-width information at a point in plotting processing is all turned off at step S9. Thus it is indicated that all the line-width information are unused (ineffective). Note that the flag array ADJUST is a one-dimensional array, having HCOUNT+VCOUNT flags, ensured on the RAM 103. The ADJUST has seven flags in FIG. 8, for example. Further, to perform the initial-point processing and terminal-point processing of outline, an LS flag, which indicates vector calculation instead of reading coordinate data with respect to the initial point and terminal point of outline, is turned on.

Next, at step S902, whether or not outline-coordinate information for one character is completed is determined. If NO, the process proceeds to step S903, while if YES, the process ends. At step S903, whether or not a currently-processed control point (CURRENT) is the terminal point of the outline, i.e., whether or not terminal-point processing of the outline should be performed is determined. If it is determined that the current point is not the terminal point, the process proceeds to step S904.

At step S904, outline-coordinate information for one control point indicated by a read pointer is read, and the read information is stored into the variable CURRENT. The read pointer indicates a memory address of RAM 103 to read data from outline-coordinate information as shown in FIG. 2. Then the process proceeds to step S905 at which whether or not the control point of the variable CURRENT is the initial point of the outline, i.e., initial-point processing of the outline should be performed or not is determined. If it is determined that the control point is the initial point, the process proceeds to step S906, otherwise, proceeds to step S912.

In initial-point processing of the present embodiment is performed through two routes from step S906. At step S906, if it is determined that the LS flag is off, the LS flag is turned on at step S907, and at step S908, the variable CURRENT is stored into a variable BEGIN which indicates the start point in vector calculation with the next outline-coordinate value. Further, for terminal-point processing of the outline, the variable CURRENT which is the coordinate value of the initial point is stored into a temporary storage variable TMP for vector calculation with the outline-coordinate value indicative of the terminal point of the outline. The process proceeds to step S909, at which the pointer is updated to read the next coordinate value from the outline-coordinate information. The process returns to step S904, at which the read outline-coordinate information of the next control point is read. This enables vector calculation between the initial point and the second point.

On the other hand, if it is determined at step S906 that the LS flag is on, line-width information corresponding to the line segment composed of the terminal point and the initial point is detected for initial-point processing of the outline. For this processing, the LS flag is turned off at step S910. Next, at step S911, the terminal point of the outline is read and is stored into the variable BEGIN. That is, initial-point processing is prepared. The process proceeds to step S912, at which the variable CURRENT is stored into a variable END which indicates the end point of vector calculation, then the process proceeds to step S918. This enables vector calculation between the initial point and the terminal point.

Thus, upon initial-point processing, line-width is detected in consideration of the vector between the initial point and the second point and the vector between the initial point and the terminal point, by processes through two routes from step S906. The detection results can be synthesized as described later. That is, initial-point processing according to the present embodiment is realized.

On the other hand, at step S903, if the current control point is the terminal point of the outline, the process proceeds to step S913. In the present embodiment, terminal-point processing is performed through two routes from step S913. If it is determined at step S913 that the LS flag is on, the process proceeds to step S914 at which the LS flag is turned off. Then at step S915, the variable TMP maintaining the initial point of the outline is stored into the variable END indicative of the end point of vector calculation, and the process proceeds to step S918. Since the content of the variable END is stored into the variable BEGIN at step S927 to be described later, vector calculation between the initial point and the terminal point is enabled by storing variable END at step S915.

On the other hand, if it is determined at step S913 that the LS flag is off, the process proceeds to step S916, at which the LS flag is turned on. At step S917, the initial point of the outline is stored into the variable BEGIN, and the second point is stored into the variable END, then the process proceeds to step S918. This enables vector calculation between the initial point and the second point.

Thus, line-width is detected in consideration of the vector between the final and the initial points and the vector between the initial and the second points, by processes through two routes from step S913. The detection results can be synthesized as described later. That is, terminal-point processing according to the present embodiment is realized.

At step S918, vector calculation is performed on a straight line connecting the variables BEGIN and END set as above, based on the following equation:

$$VECTOR\ (X,Y) = END\ (X,Y) - BEGIN\ (X,Y)$$

Figure 10:
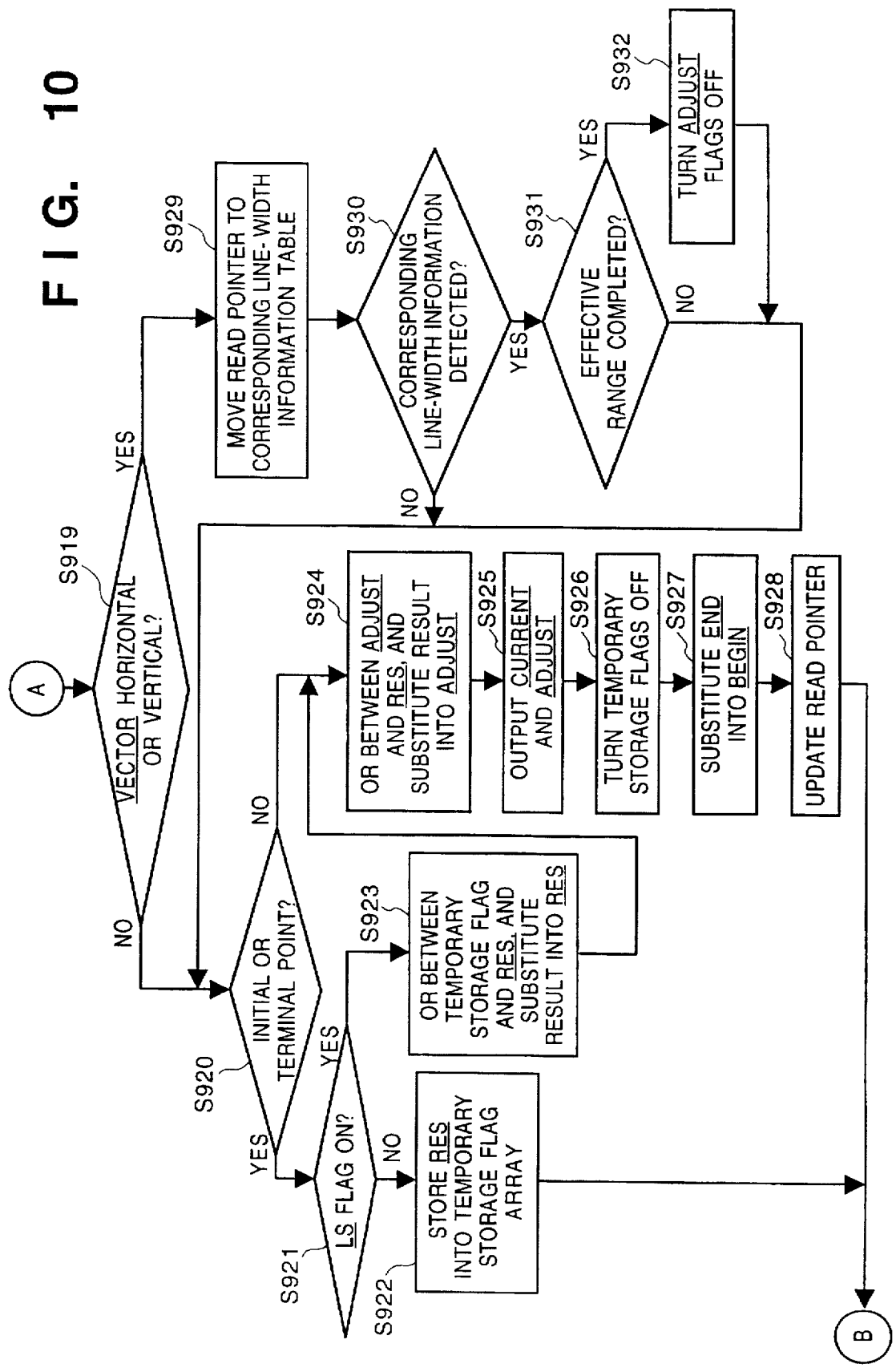

After the vector calculation at step S918 has been completed, the process proceeds to step S919 in FIG. 10. At step S919, whether the vector VECTOR (X,Y) obtained at step S918 is horizontal/vertical is determined. If it is determined that the vector VECTOR is neither horizontal nor vertical, the process proceeds to step S920. At step S920, whether the variable CURRENT is the initial/terminal point of the outline is determined. If it is determined that the variable CURRENT is the initial or terminal point, the process proceeds to step S921, while if it is determined that the variable CURRENT is neither initial nor terminal point, the process proceeds to step S924.

At step S921, the LS flag is examined. If the LS flag is off, the process proceeds to step S922, at which a flag array RES indicating the result of detection of an effective range is stored into a temporary storage flag array for initial-point processing and terminal-point processing of the outline. Note that the temporary storage flag array has the same size of that of the array ADJUST. Then the process returns to step S902 in FIG. 9. That is, to perform initial-point processing and terminal-point processing, processing on the coordinate value of the variable CURRENT is repeated instead of updating the read pointer.

On the other hand, if it is determined at step S921 that the LS flag is on, the process proceeds to step S923, at which initial-point processing or terminal-point processing is performed. That is, the temporary storage flag array and the flag array RES are logical-ORed, then the result is substituted into the flag array RES as a line-width information flag corresponding to the initial point of the outline, and the process proceeds to step S924. This projects the line-width information of the initial point.

At step S924, to indicate that the detected line-width information RES is effective, the flag arrays ADJUST and RES are logical-ORed, and the result is substituted into the flag array ADJUST. At step S925, the coordinate value CURRENT, and the flag array ADJUST as effective-range information corresponding to the read coordinate value CURRENT as shown in FIG. 8, are outputted. At step S926, temporary storage flags for the initial point of the outline are all turned off. The process proceeds to step S927, at which the variable END is stored, as the start point of the next vector calculation, into the variable BEGIN. At step S928, the point is updated for reading the next coordinate value. Then the process returns to step S902 in FIG. 9.

On the other hand, if it is determined at step S919 that the vector VECTOR (X,Y) is horizontal/vertical, the process proceeds to step S929, at which the table pointer which indicates a line-width information is moved to the head of corresponding table of the line-width information table shown in FIG. 5 so as to detect corresponding line-width information. At step S930, one line-width information corresponding to the variable CURRENT is detected from the line-width information table indicated by the table pointer. Note that the detection of line-width information at step S930 will be described later. The detection result is outputted to the flag array RES having the same size as that of the flag array ADJUST. That is, in the flag array RES, only the flag of the detected line-width information is on. If nothing has been detected, all the flags of the flag array RES are off. In this manner, if the corresponding line-width information has been detected, the process proceeds to step S931, otherwise, proceeds to step S920.

At step S931, whether or not the effective range of the correction information in the outline-correction values has been completed is determined based on the line-width information RES detected at step S930. If YES, the process proceeds to step S932, while if NO, proceeds to step S920. Note that the determination of completion of the effective range at step S931 will be described later. At step S932, since it has been determined at step S931 that the effective range has been completed, all the flags of the flag array ADJUST are turned off, and the process proceeds to step S920.

Next, the line-width information detection at step S930 will be described in detail with reference to the flowchart of FIG. 11.

The line-width information detection of the present embodiment is detecting line-width information corresponding to a control point indicated by the variable CURRENT, from the line-width information table shown in FIG. 5.

Figure 11:
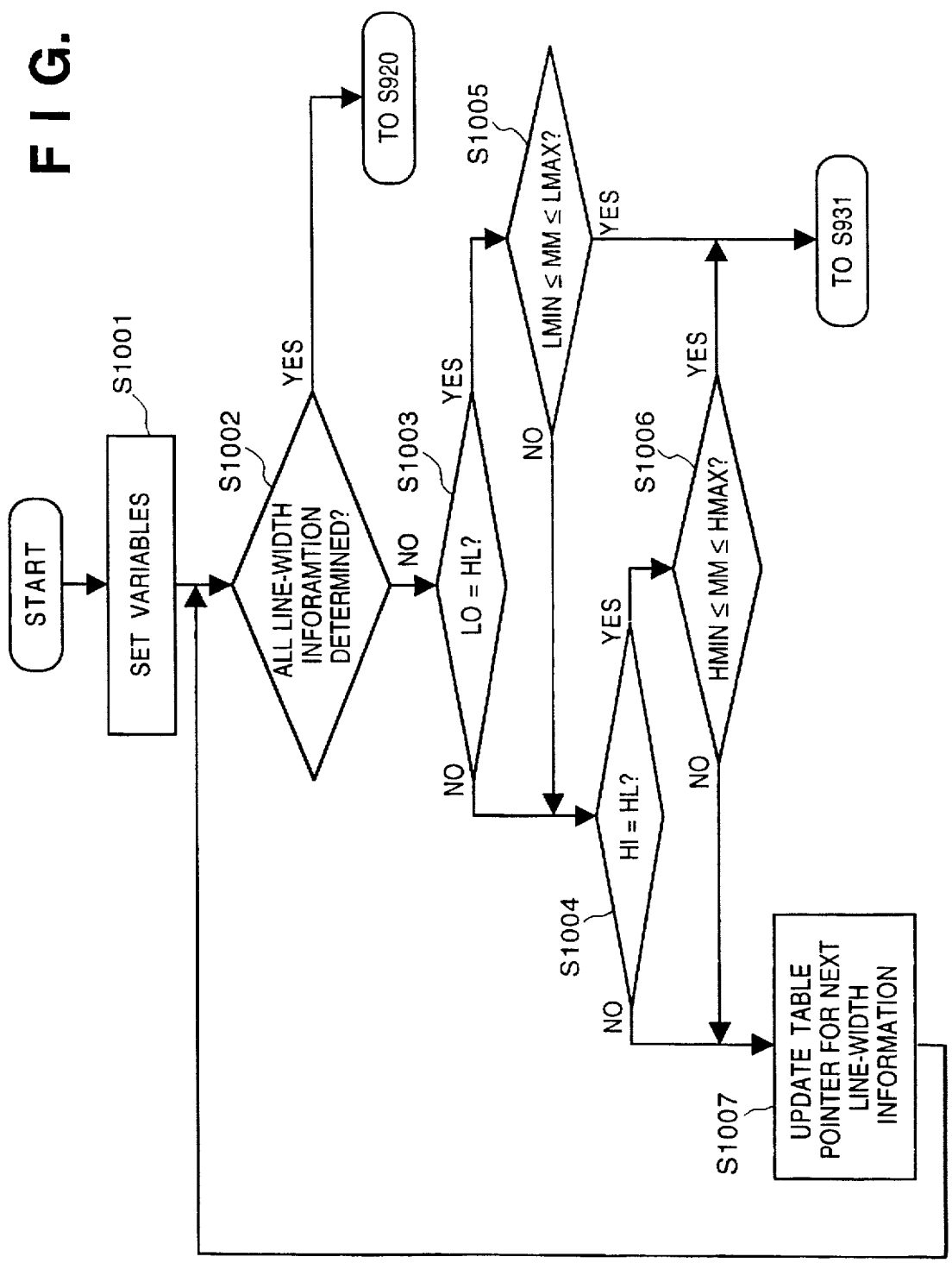
FIG. 11 is a flowchart showing line-width detection processing according to the first embodiment.

In FIG. 11, at step S1001, the number of line-width information NUMLINE included in the corresponding line-width information table and address information of the line-width information table are set. Also, a coordinate value HL for comparison with the lowest or highest coordinate value in the heightwise direction of a line width, and a coordinate value MM for comparison with the minimum or maximum coordinate value in the lengthwise direction of the line width are set from the outline-coordinate values of the read variable CURRENT.

For example, when line-width information corresponding to the horizontal line-width information table is detected, the number of line widths HCOUNT is substituted into the number of line-width information NUMLINE, and the table pointer is set to the address of the first line-width information of the horizontal line-width information table. Further, the Y-coordinate value of the variable CURRENT is substituted into the coordinate value HL, and the X-coordinate value of the variable CURRENT is substituted into the coordinate value MM.

On the other hand, when line-width information corresponding to the vertical line-width information table is detected, the number of line-widths VCOUNT is substituted into the number of line-width information NUMLINE, and the table pointer is set to the address of the first line-width information of the vertical line-width information table. Further, the X-coordinate value of the variable CURRENT is substituted into the coordinate value HL, and the Y-coordinate value of the variable CURRENT is substituted into the coordinate value MM.

Next, at step S1002, with respect to all the line-width information corresponding to the number of line-width information NUMLINE of the line-width information table indicated by the table pointer, whether or not the detection has been completed is determined. If YES, it is determined that line-width information corresponding to the plotting of the variable CURRENT is not included in the line-width information table, and the process returns to step S920 in FIG. 10.

On the other hand, if it is determined at step S1002 that there is unprocessed line-width information, the process proceeds to step S1003. At step S1003, whether or not the lowest coordinate value LO of the line-width information is equal to the value HL set at step S1001 is determined. If YES, the process proceeds to step S1005, while if NO, proceeds to step S1004.

At step S1004, whether or not the highest coordinate value HI of the line-width information is equal to the value HL is determined. If YES, the process proceeds to step S1006, at which whether or not the value MM set at step S1001 is equal to or greater than the highest minimum coordinate value HMIN of the line-width information, and equal to or less than the highest maximum coordinate value HMAX is determined. If these conditions are satisfied, the process advances to step S931 in FIG. 10, otherwise, the process proceeds to step S1007.

On the other hand, if it is determined at step S1004 that the highest coordinate value HI is not equal to the value HL, the process proceeds to step S1007. As the line-width information does not correspond to plotting, the table pointer is updated for obtaining the next line-width information in the line-width information table. Then the process returns to step S1002.

If it is determined at step S1003 that the lowest coordinate value LO is equal to the value HL, the process proceeds to step S1005, at which whether or not the value MM set at step S1001 is equal to or greater than the lowest minimum coordinate value LMIN, and equal to or less than the lowest maximum coordinate value LMAX is determined. If these conditions are satisfied, the process advances to step S931 in FIG. 10, otherwise, the process proceeds to step S1004.

That is, when the process advances to step S931, it is determined that the line-width information corresponding to plotting of the variable CURRENT is maintained in the line-width information table.

Next, the algorithm at step S931 in FIG. 10 to determine the completion of effective-range will be described in detail with reference to the flowchart of FIG. 12.

In the determination of the completion of effective-range, if the line-width information of the variable CURRENT detected at step S930 overlaps with the line-width information currently regarded as effective, it is determined that the effective range has been completed.

Figure 12:
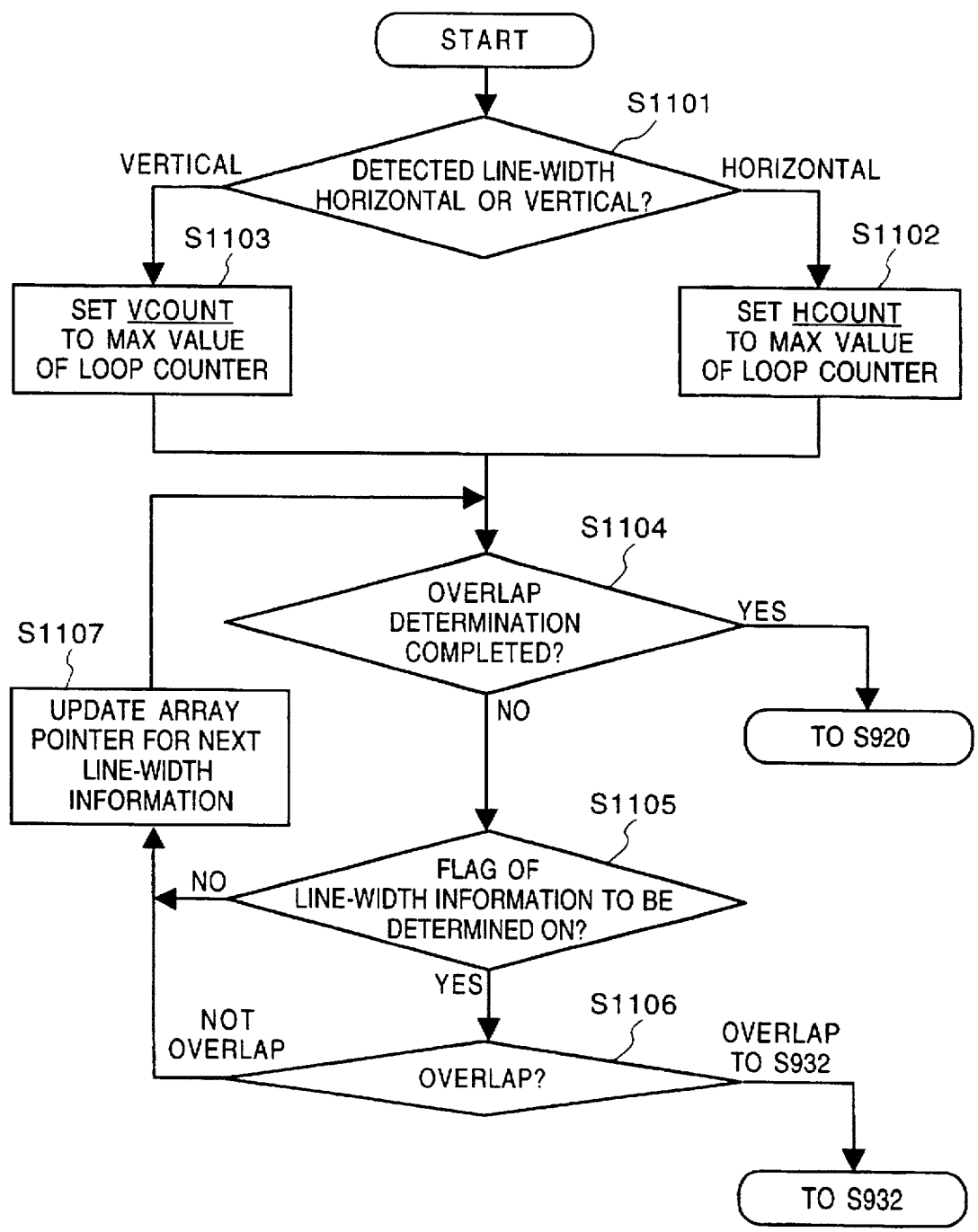
FIG. 12 is a flowchart showing processing of confirming the completion of effective-range according to the first embodiment.

In FIG. 12, at step S1101, if the line-width information of the variable CURRENT detected at step S930 in FIG. 9 is horizontal line-width information, the process proceeds to step S1102, while if it is vertical line-width information, the process proceeds to step S1103. At step S1102, the array pointer which indicates the data in array is moved to the head of the horizontal line-width information flag of the flag array ADJUST indicating the current effective line-width information, and at the following steps, the number of horizontal line-widths HCOUNT is set to the maximum value of a loop counter.

On the other hand, at step S1103, the array pointer is moved to the head of the vertical line-width information flag of the flag array ADJUST, and at the following steps, the number of vertical line-widths VCOUNT is set to the maximum value of a loop counter.

After the completion of step S1102 or S1103, the process proceeds to step S1104, at which whether or not the determination of overlap with respect to all the horizontal or vertical line-width information with the variable CURRENT has been completed is determined. If YES, it is determined that the effective range has not been completed, and the process returns to step S920 in FIG. 10. On the other hand, if NO, the process proceeds to step S1105.

At step S1105, whether or not the line-width information flag to be subjected to the determination of overlap is on is determined. If the flag is on, the process proceeds to step S1106, while if the flag is off, as it is unnecessary to perform the determination of overlap, the process proceeds to step S1107.

At step S1106, the determination of overlap between the line-width information of the variable CURRENT and the line-width information indicated by the table pointer is performed. Note that the determination of overlap will be described in detail later. If it is determined at step S1106 that the line-width information of the variable CURRENT and the line-width information indicated by the table pointer overlap with each other, it is considered that the effective range is completed, and the process advances to step S932 in FIG. 10, otherwise, the process proceeds to step S1107.

At step S1107, to perform determination of overlap between the line-width information of the variable CURRENT and the next line-width information stored in the line-width information table, the table pointer for the line-width information table is updated.

As described above, if it is determined that the line-width information of the variable CURRENT overlaps with the flag array ADJUST indicating the already detected line-width information, the process proceeds to step S932 in FIG. 10, otherwise, returns to step S920 in FIG. 10.

Figure 13:
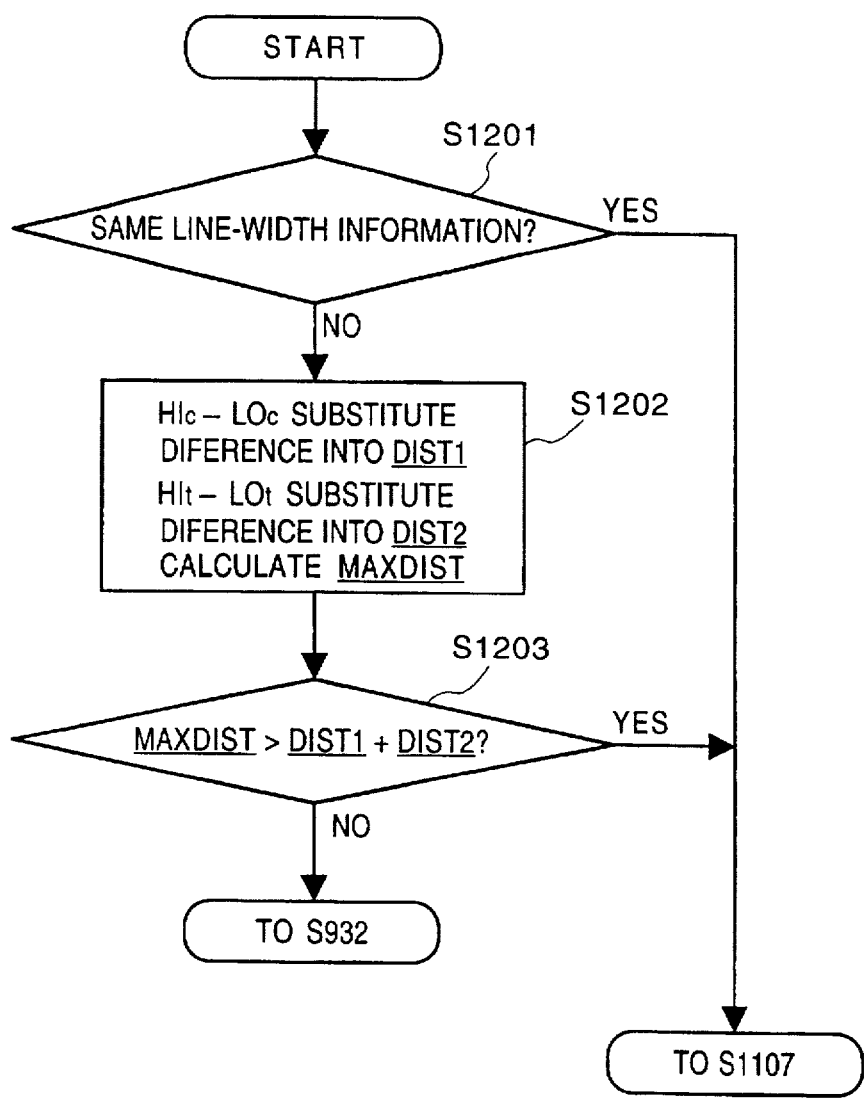
FIG. 13 is a flowchart showing overlap judgment processing according to the first embodiment.

Next, the aforementioned determination of overlap at step S1106 in FIG. 12 will be described in detail with reference to the flowchart of FIG. 13.

At step S1201, whether or not two line-width information as the objects of determination are identical to each other is determined. If YES, it is determined that the line-width information do not overlap, and the process proceeds to step S1107 in FIG. 12, while if NO, proceeds to step S1202.

At step S1202, the difference (distance) between the highest coordinate value HIc and the lowest coordinate value LOc of the line-width information of the variable CURRENT is obtained, and the distance is substituted into a distance DIST1. At the same time, the difference (distance) between the highest coordinate value HIt and the lowest coordinate value LOt of the line-width information indicated by the pointer, in the line-width information table, is obtained, and this distance is substituted into a distance DIST2. Further, the maximum value and the minimum value are obtained from the highest coordinate value HIc and the lowest coordinate value LOc of the line-width information of the variable CURRENT, and the highest coordinate value HIt and the lowest coordinate value LOt of the line-width information indicated by the table pointer. The difference between the maximum and minimum values is substituted into a maximum distance MAXDIST. At step S1203, whether or not the maximum distance MAXDIST is greater than the sum of the distances DIST1 and DIST2 is determined. If YES, it is determined that the two line-width information do not overlap, and the process proceeds to step S1107. If NO, it is determined that the two line-width information overlap with each other, and the process advances to step S932 in FIG. 11.

That is, in the present embodiment, with respect to line-width information which has newly become effective upon plotting (line-width information corresponding to the variable CURRENT), if line-width information having an area which overlaps with a range represented by its lowest coordinate value LO and highest coordinate value HI exists in the line-width information table of the corresponding direction, and if the line-width information having the overlap area is recognized as effective line-width information (ADJUST) upon detection of line-width information of the variable CURRENT, all the currently-effective line-width information are purged off (at step S932). As a result, only the line-width information corresponding to the variable CURRENT is effective from the subsequent plotting.

The above-described processing determines an effective range of outline-coordinate values where the respective line-width information are effective corresponding to plotting the variable CURRENT.

That is, in the present embodiment, the line-width information once detected for plotting (line-width information of the variable CURRENT) is recognized in the subsequent plotting as effective line-width information (ADJUST) until a condition for changing the effective line-width information to ineffective (step S931) is satisfied. Thus, the continuous flags which are on in the line-width information flag array determines the effective range of correction information.

According to the present embodiment, by performing the above processing on all the outline-coordinate information, the range where line-width information upon plotting is effective can be determined in the form of arrays in coordinate units. Accordingly, it is possible, immediately, to divide outline-coordinate correction information which should not be performed, and realize high-quality character output.

Further, as a correction-information effective range can be determined in the order of plotted outline points, actual handling of pointer to refer to the effective range is simple. Thus determination of effective/ineffective regarding correction information can be made with the minimum load.

<Second Embodiment>

Next, a second embodiment of the present invention will be described.

Note that the apparatus according to the second embodiment has the same construction as that of the first embodiment, and construction and processing not described in this embodiment correspond to those described in the first embodiment.

In the above first embodiment, an effective range of line-width information in plotting process can be determined by clarifying effective line-width information upon coordinate plotting in the form of on/off flag arrays as shown in FIG. 8.

In the second embodiment, based on the outputted flag arrays as shown in FIG. 8, start and end points of the respective outline coordinate information in the effective range are extracted and newly outputted by each line-width information. Hereinafter, an algorithm to determine an effective range according to the second embodiment will be described with reference to FIGS. 14 and 15.

Figure 14:
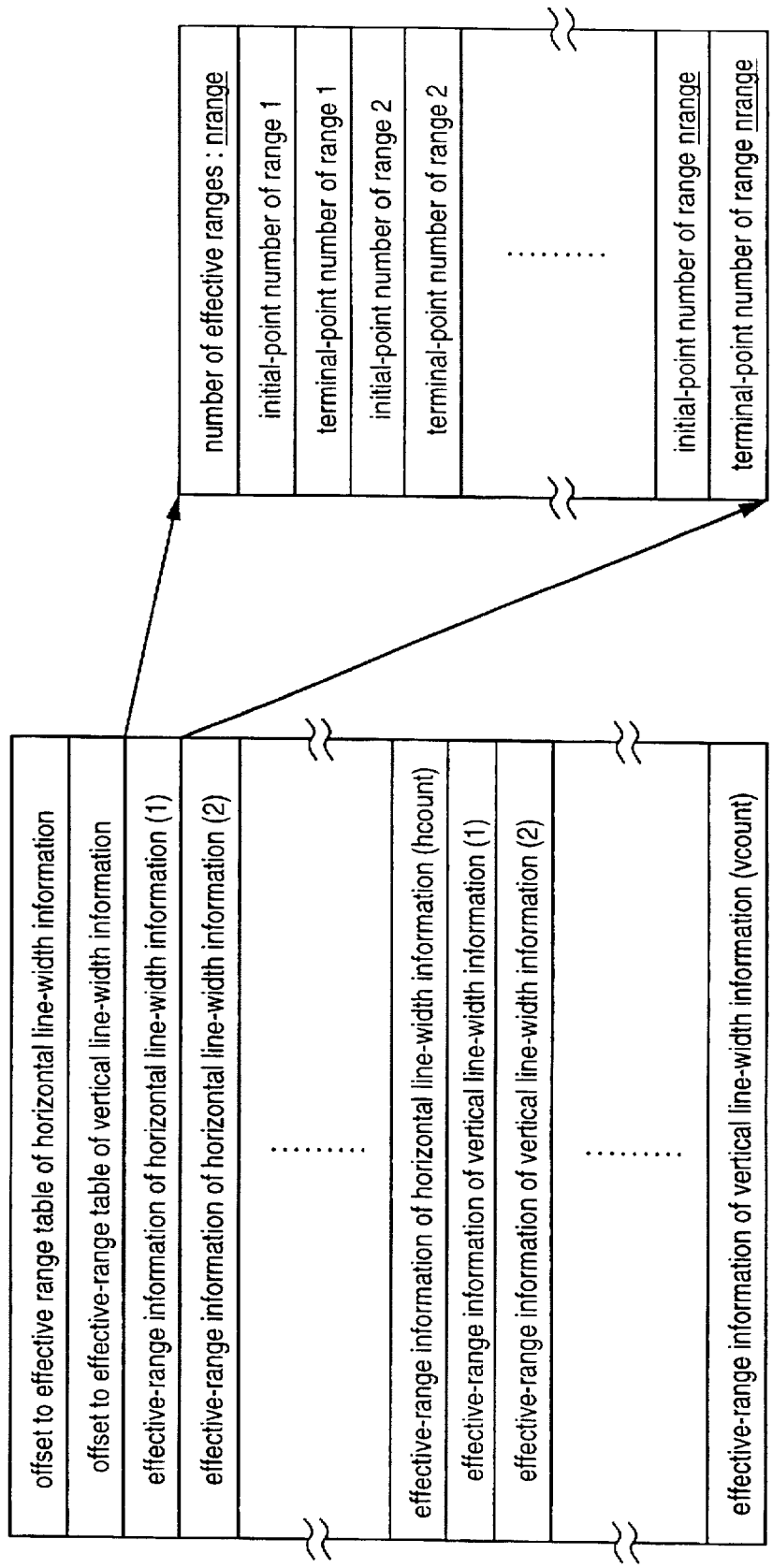
FIG. 14 is a table showing output format of an effective range in a second embodiment of the present invention.

FIG. 14 shows the output format of an effective range of respective line-width information according to the second embodiment. In this output format, first, offset values respectively to the horizontal line-width information table and vertical line-width information table are stored. If there is no line-width information, a value "0" is stored. Next, with respect to the line-width information tables, effective-range information for the number of line-width information are maintained. In the first embodiment, the output arrays as shown in FIG. 8 are stored in the order of horizontal line-width information → vertical line-width information, whereas in the second embodiment, horizontal line-width information and vertical line-width information are automatically stored in the order as shown in FIG. 14, by extraction of start and end points in the effective range regardless of horizontal/vertical distinction from the output arrays. Note that the information length of the effective range is variable, and the data structure of the effective range is as shown in FIG. 14. First, the number of effective ranges nrange is stored as effective-range information, then, information on an initial point number and a terminal point number of the nrange is stored.

Figure 15:
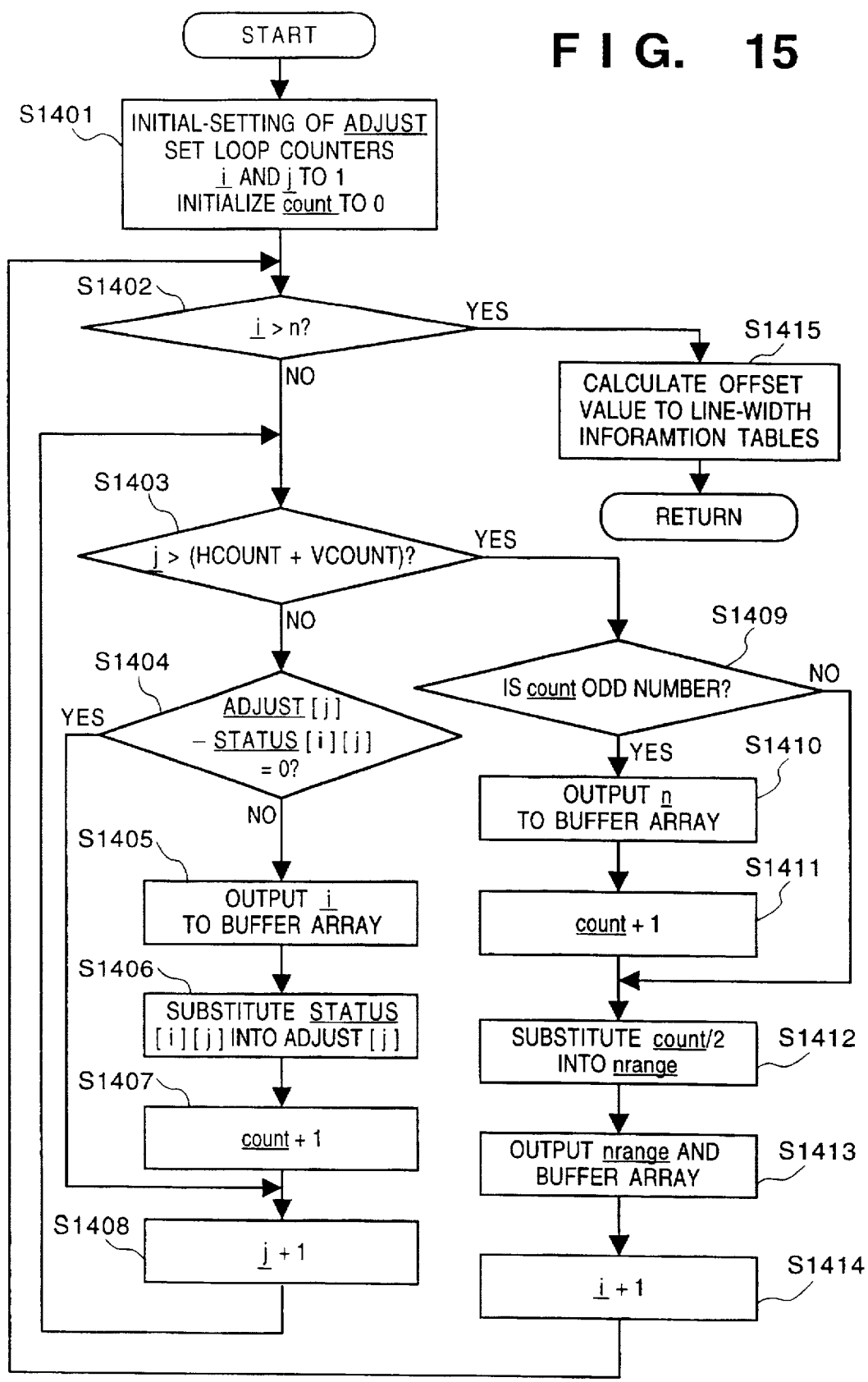
FIG. 15 is a flowchart showing effective-range output processing according to the second embodiment.

FIG. 15 shows a flowchart of effective-range determination processing according to the second embodiment.

At step S1401, as initial setting, the flags of the respective elements of the flag array ADJUST which indicates effective line-width information in plotting process are turned to "0". Then, a loop counter value i which indicates a control-point number in outline-coordinate information, and a loop counter value j which indicates the number of elements in the flag array ADJUST, are initialized to "1". Further, a variable count which indicates the number of variations of effective range is initialized to "0".

Next, at step S1402, whether or not the counter value i exceeds the number n of all the control points in the outline-coordinate information, i.e., processing with respect to all the control points has been completed is determined. If YES, the process proceeds to step S1415, at which the size of effective-range information with respect to all the line-width information is obtained, and offset-value calculation is performed in the respective line-width information tables.

On the other hand, if it is determined at step S1402 that the processing has not been completed, the process proceeds to step S1403, at which whether or not the count value j exceeds the sum of the numbers HCOUNT and VCOUNT, i.e., whether or not the processing with respect to all the elements (all line-width information) of the flag array ADJUST has been completed is determined. If NO, the process proceeds to step S1404.

At step S1404, whether or not the difference between j-th line-width information (ADJUST[j]) and j-th element of line-width information flag array portion STATUS indicative of effective line-width information of a control-point number i (STATUS [i][j]) is "0" is determined. If YES, the process proceeds to step S1408, while if NO, it is considered that this result indicates the start or end of the effective range, the process proceeds to step S1045.

At step S1405, it is determined that the current control-point number i is the start or end point of the effective range, the control point number i is stored in a temporary storage buffer array. The process proceeds to step S1406, at which the content of the flag-array portion STATUS[i][j] is substituted into the line-width information ADJUST[j] so as to update effective/ineffective status of the line-width information ADJUST[j]. Next, at step S1407, the number count of variations of effective range is incremented by one, and at step S1408, the loop counter value j is incremented by one. Thereafter, the process returns to step S1403 to perform the processing with respect to the next line-width information.

On the other hand, if it is determined at step S1403 that the processing with respect to all the elements of the flag array ADJUST has been completed, the process proceeds to step S1409. At step S1409, whether or not the number of variations count is an odd number is determined. If YES, the process proceeds to step S1410, while if NO, proceeds to step S1412.

At step S1410, as the line-width information is effective upon the completion of plotting, the number n of the final outline control point is stored into the temporary storage buffer array as the terminal point of the effective range. At step S1411, the number of variations count of the effective range is incremented by one.

At step S1412, as the division of the number of variations count of the effective range by 2 results a number within the effective range, the value of count/2 is substituted into the number of effective ranges nrange. Then at step S1413, the number nrange and effective-range information of the respective line-width information stored in the temporary storage buffer array are outputted. At step S1414, the loop counter value i is incremented by one, and the process returns to step S1402 for processing the next control point.

As a result of the above processing, the output can be obtained in the form as shown in FIG. 14.

According to the second embodiment, effective ranges of the respective line-width information are held as outline control-point numbers, so that effective ranges of line-width information at plotting process can be indicated in the form of arrays in correction-information units. Accordingly, the effective range can be indicated with less data amount than output arrays in the first embodiment, thus high-quality character output similar to the first embodiment can be attained.

<Third Embodiment>

Next, a third embodiment of the present invention will be described.

As the third embodiment, an application of the present invention to a standard defined in the original concept JISX4163 (hereinafter the standard will be referred to as "X4163 standard"), "Part 3 Glyph Shape Representation" (Japan Business Machine Makers Association, Technical Seminar / Reference of Guidance on Document-Concerned JIS Standard, Mar. 10, 1994). Note that this standard is translation of ISO/ICE 9541-3 (Information Technology-Font Information Interchange-Part 3 Glyph Shape Representation) as the first edition published in 1994, without any change of technical matter and standard list.

Note that the detailed description of the standard (X4163) will be omitted.

The line-width information as described in the first and second embodiments corresponds to a hint area in the X4163 standard. Similarly, the horizontal line-width information corresponds to information hstem of the X4163 standard, and the vertical line-width information, to information vstem of the X4163 standard. In the third embodiment, these two information, vstem and hstem, are treated as information STEM for the purpose of simple and clear explanation.

Further, the condition for the completion of effective range in the first embodiment is equivalent to the condition for exchange of an overlap hint area in the X4163 standard. Since a command once issued in connection with a hint area is effective immediately before an overlap hint-area exchange command is issued, the effective range in the first embodiment can be applied to the third embodiment.

FIG. 16 shows a part of plotting command definitions of the X4163 standard. Though the details of functions of the respective commands are omitted, a typical plotting command of the X4163 standard starts with a command xrpe to declare a reference point and wind, and ends with a command endglyph to declare the termination of character plotting. Between issuance of these commands, outline of the outline-coordinate information is plotted. Each outline plotting starts with a command hmoveto, vmoveto or rmoveto, to order movement to the initial point of the outline, and ends with a command closepath to declare the end of outline.

In the above series of plotting commands, if the above-mentioned condition for hint-area exchange is satisfied, an overlap hint-area exchange command is issued. In this embodiment, this function is represented by a command CHANGE for the purpose of simple and clear explanation.

Similarly, movement commands (hmoveto, vmoveto and rmoveto) are represented by a command MOVETO; straight-line plotting commands (hlineto, vlineto and rlineto), a command LINETO; and curved-line plotting commands (hvcurveto, vhcurveto, rrcurveto), a command CURVETO.

Figure 17:
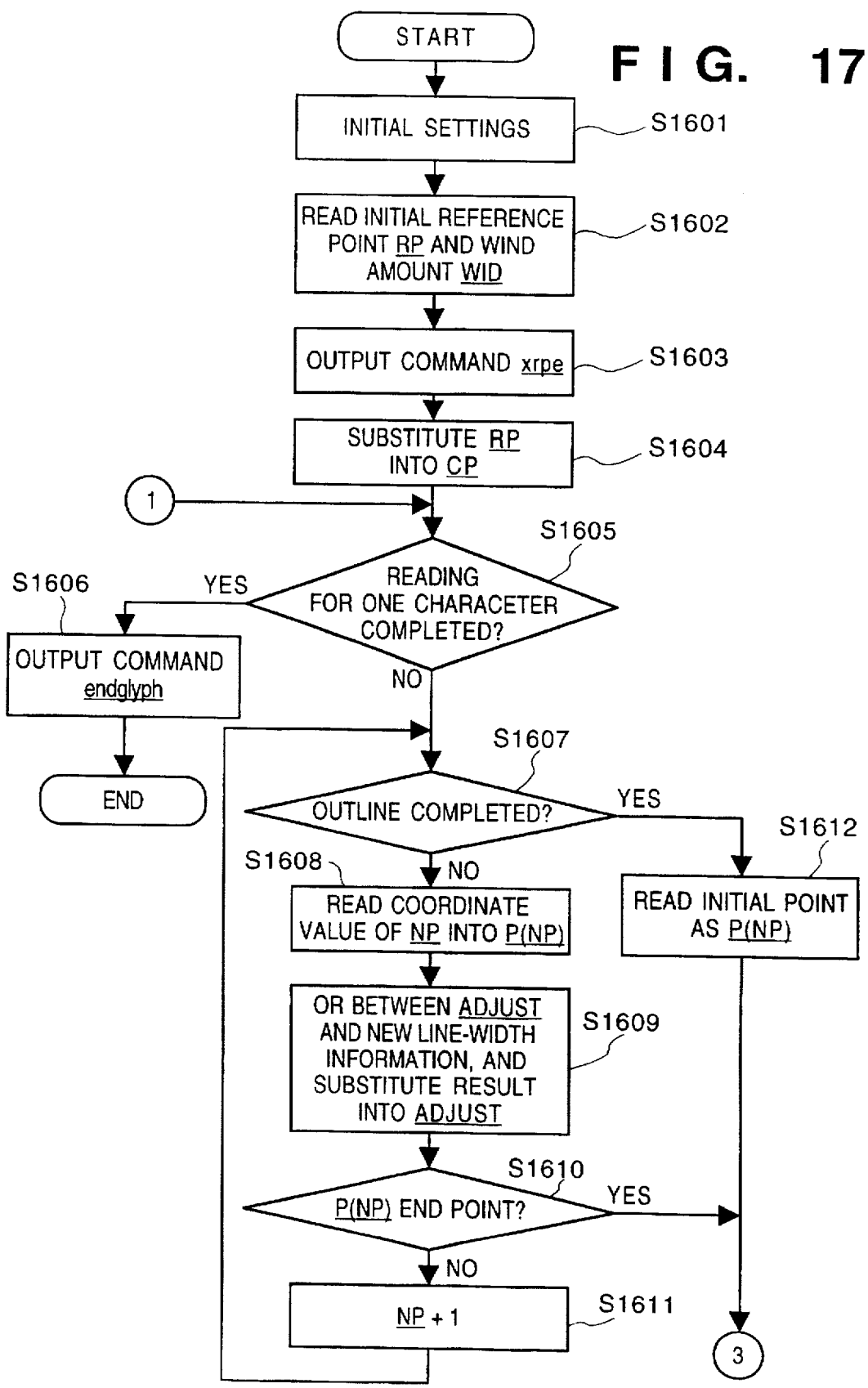
FIGS. 17 to 19 are flowcharts showing effective-range output processing according to the third embodiment.
Figure 18:
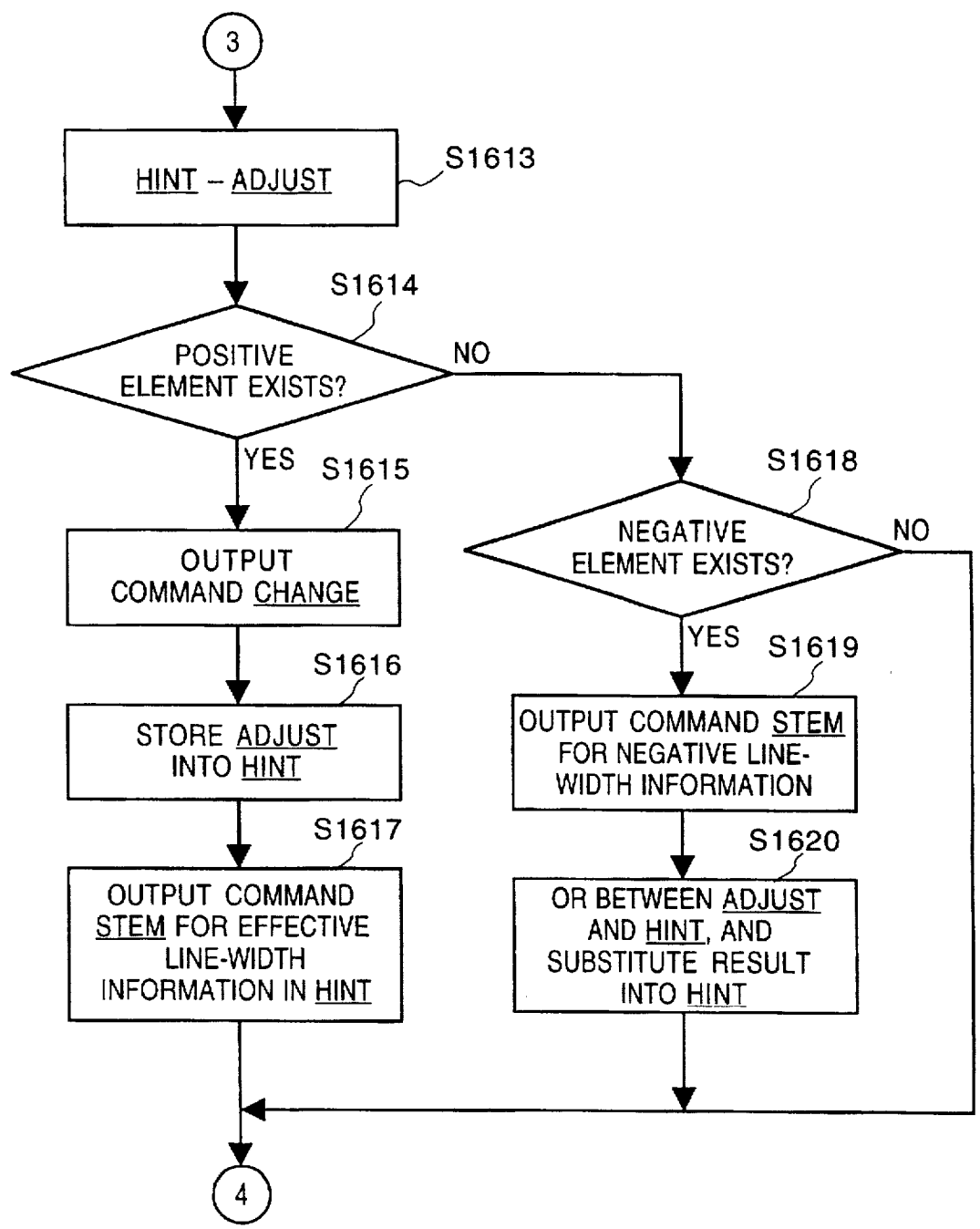
Figure 19:
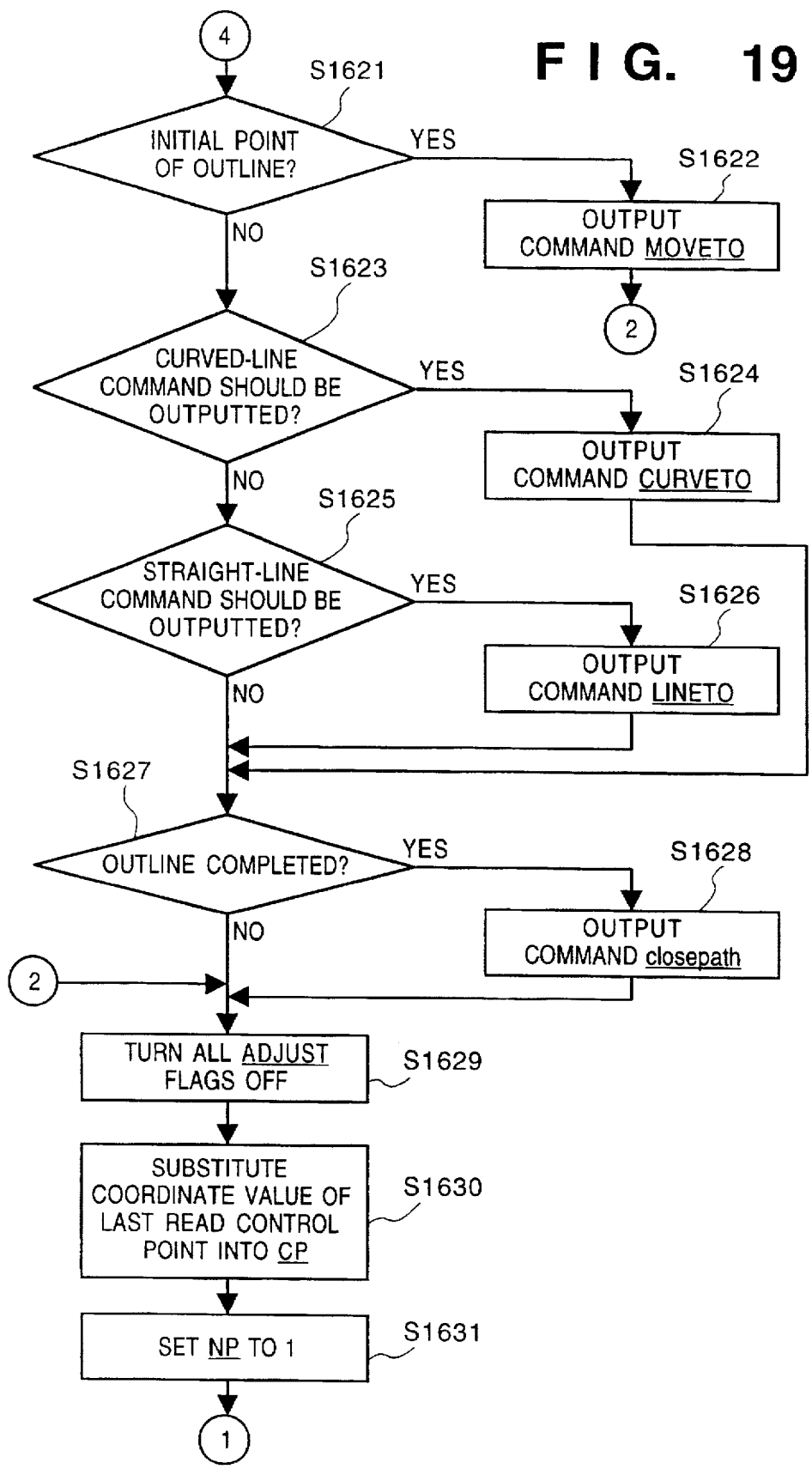

FIGS. 17 to 19 show a flowchart of effective-range output processing according to the third embodiment. In the third embodiment, the processing is performed by using the outline-coordinate information as shown in FIG. 2, the line-width information table as shown in FIG. 5, the array information outputted in the format as shown in FIG. 8, and metrics information such as an initial reference point RP and a character-wind amount WID.

First, at step S1601 in FIG. 17, as initial setting, a flag array HINT indicating effective line-width information in plotting and the flag array ADJUST for storing effective line-width information with respect to a read point are all turned off. Further, a value NP indicating the number of control points (control-point number), which has been read during one plotting from an end point to end point, is set to "1". Next, at step S1602, the initial reference point RP and character-feed amount WID are read, and at step S1603, the xrpe command of the X4163 standard is outputted. At step S1604, the coordinate value of the initial reference point RP is substituted into a variable CP indicating the current point for movement-amount calculation in the X4163 standard, and the process proceeds to step S1605.

Hereinafter, the processing through steps S1605 to S1612 is for inputting coordinate points and line-width information.

At step S1605, whether or not processing for one character has been completed is determined. If YES, process proceeds to step S1606, at which the command endglyph to declare the termination of character plotting is outputted, and the process ends. On the other hand, if it is determined at step S1605 that the processing for one character has not been completed, the process proceeds to step S1607. At step S1607, whether or not reading of the outline by the terminal point has been completed is determined. If NO, the process proceeds to step S1608, at which the coordinate information corresponding to the control-point number NP is read from the arrays shown in FIG. 8, and the read information is stored into a point array element P(NP). Then at step S1609, the flag array of the line-width information corresponding to the control-point number NP is read from the arrays in FIG. 8. The read flag array and the array ADJUST are ORed, and the result is newly stored into the flag array ADJUST. Thus, the flag array ADJUST becomes a flag array that indicates line-width information to be outputted before output of the next plotting command.

Next, at step S1610, whether or not the element P(NP) is an end point is determined. If YES, the process proceeds to step S1613 in FIG. 18, while it NO, i.e., if it is an intermediate point, the process proceeds to step S1611, at which the control-point number NP is incremented by one.

On the other hand, if it is determined at step S1607 that the terminal point of the outline has been completed, the process proceeds to step S1612, at which an initial point of outline is read as P(NP). Note that an initial point of outline is always an end point.

Hereinafter, the processing through steps S1613 to S1620 is for determining an effective range of line-width information according to the third embodiment.

At step S1613, with respect to each element of two flag arrays HINT and ADJUST, the array ADJUST is subtracted from the array HINT by the number (HCOUNT+VCOUNT) of elements indicating corresponding line widths. At step S1614, if there is at least one element having a positive result (value of ADJUST element, which has been turned off) in the subtraction (HINT−ADJUST) at step S1613, it is determined that the effective range has been completed, and the process proceeds to step S1615. At step S1615, as the effective range has been completed, the command CHANGE is issued so as to exchange the hint area of the X4163 standard. At step S1616, the array ADJUST is substituted as effective line-width information after exchange of hint-area into the array HINT. Next, at step S1617, the hint-area definition command STEM is issued with respect to the line-width information indicated by the array HINT as effective. On the other hand, if there is no element having a positive result of subtraction at step S1614, it is determined that hint-area exchange is not necessary, and the process proceeds to step S1618, at which whether or not there is at least one element having a negative result (value of an of ADJUST element, which has been changed to on) in the subtraction at step S1613 is determined. If YES, it is determined that there is element(s) at which the hint area should be newly defined, and the process proceeds to step S1619, while if NO, proceeds to step S1621 in FIG. 19. At step S1619, with respect to the line-width information having the negative result of subtraction at step S1613, the hint-area definition command STEM of the X4163 standard is outputted. At step S1620, the arrays HINT and ADJUST are ORed, and the result is substituted as a flag array indicating currently-effective line-width information into the array HINT.

Hereinafter, the processing through steps S1621 to S1628 is for outputting commands according to the third embodiment.

At step S1621, if it is determined that the last read control point is the initial point of the outline, the process proceeds to step S1622, otherwise, proceeds to step S1623. At step S1622, a movement amount is calculated from the last read control point P(NP) and the current point CP, and the movement command MOVETO of the X4163 standard is outputted, and the process proceeds to step S1629.

At step S1623, whether or not a curved-line command should be outputted is determined. If there is intermediate point(s) between the end points, it is determined that the curved-line command should be outputted, and the process proceeds to step S1624, at which the curved-line command CURVETO of the X4163 standard is outputted based on the current point CP and the NP control points from the current point CP and the read control point P(NP), and the process proceeds to step S1627.

If it is determined that the curved-line command should not be outputted, the process proceeds to step S1625, at which whether or not a straight-line command should be outputted is determined. If a straight line from the terminal point to the initial point of the outline is plotted, the straight-line command is not outputted, and the process proceeds to step S1627. Otherwise, the process proceeds to step S1626, at which the straight-line command LINETO of the X4163 standard is outputted based on the current point CP and the initially-read point P(1), and the process proceeds to step S1627.

At step S1627, whether or not the final control point of the outline has been read is determined. If YES, the process proceeds to step S1628, while if NO, proceeds to step S1629. At step S1628, the command closepath indicating the termination of outline is outputted.

Hereinafter, the processing through steps S1629 to S1631 is for initialization for the next command output according to the third embodiment.

At step S1629, all the elements of the flag array ADJUST are turned off, then at step S1630, the coordinate value of the last read control point is substituted into the current point CP. At step S1631, the number of control points NP is set to "1", and the process returns to step S1605 in FIG. 17.

As described above, according to the third embodiment, plotting process and an effective range of line-width information can be represented in the form of commands of the X4163 standard. Accordingly, high-quality character output can be attained by determining an effective range so as to divide outline-coordinate correction information, which should not be performed simultaneously, and by applying this effective-range determination to the X4163 standard.

Note that the correction-information effective range output in the above-described second embodiment can also be applied to the third embodiment.

Further, in the above first to third embodiments, the effective ranges of correction information are respectively outputted in the form of arrays in coordinate value units, in the form of arrays in correction information units, and in the form of commands. It may be arranged such that in the character processing apparatus of the present invention, an operator can select one of the output formats.

<Other Embodiment>

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 20:
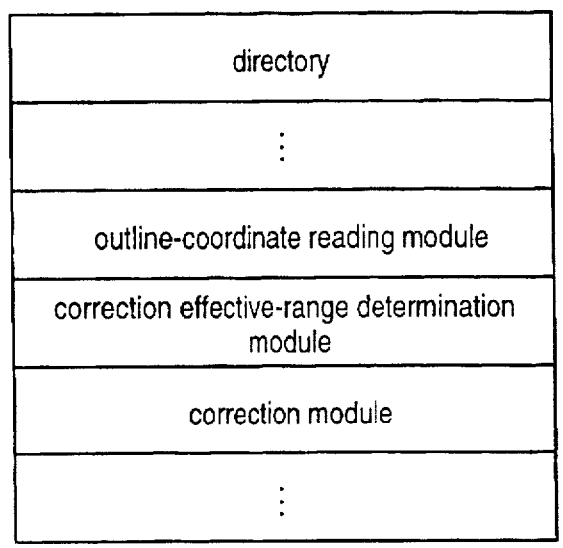
FIG. 20 is a flowchart showing a memory map in a case where the present invention is applied to a storage medium.

In a case where the present invention is applied to the aforesaid storage medium, the storage medium stores program codes corresponding to the flowcharts described in the embodiments. Briefly, the storage medium stores each module shown as an example of a memory map in FIG. 20. More specifically, program codes which correspond to outline-coordinate reading module, correction effective-range determination module, and correction module, at least, are to be stored in the storage medium.

The present invention is not limited to the above embodiments and various changes and modifications can be made within the spirit and scope of the present invention. Therefore, to apprise the public of the scope of the present invention, the following claims are made.

What is claimed is:

1. A character processing apparatus using outline font that represents a shape of a character with outline coordinates, comprising:

coordinate reading means for reading the outline coordinates;

effective-range determination means for determining an effective range, allowing correction on the outline coordinates, in a plurality of correction information; and correction means for correcting the outline coordinates, in accordance with correction information within the effective range determined by said effective-range determination means.

2. The character processing apparatus according to claim 1, further comprising character-pattern generation means for generating a character pattern, based on the outline coordinates corrected by said correction means.

3. The character processing apparatus according to claim 2, further comprising output means for outputting the character pattern generated by said character-pattern generation means.

4. The character processing apparatus according to claim 3, wherein said output means is a printer.

5. The character processing apparatus according to claim 3, wherein said output means is a display.

6. The character processing apparatus according to claim 1, wherein the correction information is line-width information of outline.

7. The character processing apparatus according to claim 1, wherein the outline coordinates indicate an end point of a straight line.

8. The character processing apparatus according to claim 1, wherein the outline coordinates indicate an intermediate point of a Bezier curved line.

9. The character processing apparatus according to claim 1, wherein said effective-range determination means determines the effective range of correction information, in order of plotting of the outline coordinates.

10. The character processing apparatus according to claim 9, wherein said effective-range determination means determines the effective range by determining completion of the effective range of correction information in order of plotting the outline coordinates.

11. The character processing apparatus according to claim 9, wherein said effective-range determination means represents the effective range as a series of effective flags of the correction information by each of the outline coordinates.

12. The character processing apparatus according to claim 9, wherein said effective-range determination means determines the effective range, based on overlap of the correction information corresponding to the outline coordinates.

13. The character processing apparatus according to claim 1, further comprising effective-range output means for outputting the effective range, wherein said correction means corrects the outline coordinates, in accordance with the correction information within the effective range outputted by said effective-range output means.

14. The character processing apparatus according to claim 13, wherein said effective-range output means outputs the effective range in form of array by each of the outline coordinates.

15. The character processing apparatus according to claim 13, wherein said effective-range output means outputs the effective range in form of array by each of the correction information.

16. The character processing apparatus according to claim 13, wherein said effective-range output means outputs the effective range in form of plotting commands.

17. The character processing apparatus according to claim 1, further comprising character-information reading means for reading character-design information, wherein said effective-range determination means determines the effective range by referring to the character-design information.

18. The character processing apparatus according to claim 17, wherein the character-design information is indicative of coordinates of character design.

19. The character processing apparatus according to claim 17, wherein the character-design information is an initial reference point of character design.

20. The character processing apparatus according to claim 17, wherein the character-design information is character-wind amount of character design.

21. The character processing apparatus according to claim 17, wherein said effective-range determination means determines the effective range, based on an amount of movement of the outline coordinates from immediately-previous coordinates.

22. A character processing method using outline font that represents a shape of a character with outline coordinates, comprising:

a coordinate reading step of reading the outline coordinates;

an effective-range determination step of determining an effective range, allowing correction on the outline coordinates, in a plurality of correction information; and a correction step of correcting the outline coordinates, in accordance with correction information within the effective range determined at said effective-range determination step.

23. The character processing method according to claim 22, further comprising a character-pattern generation step of generating a character pattern, based on the outline coordinates corrected at said correction step.

24. The character processing method according to claim 23, further comprising an output step of outputting the character pattern generated at said character-pattern generation step.

25. The character processing method according to claim 22, wherein the correction information is line-width information of outline.

26. The character processing method according to claim 22, wherein the outline coordinates indicate an end point of a straight line.

27. The character processing method according to claim 22, wherein the outline coordinates indicate an intermediate point of a Bezier curved line.

28. The character processing method according to claim 22, wherein at said effective-range determination step, the effective range of correction information is determined in order of plotting of the outline coordinates.

29. The character processing method according to claim 28, wherein at said effective-range determination step, the effective range by determining completion of the effective range of correction information is determined in order of plotting the outline coordinates.

30. The character processing method according to claim 28, wherein at said effective-range determination step, the effective range is represented as a series of effective flags of the correction information by each of the outline coordinates.

31. The character processing method according to claim 28, wherein at said effective-range determination step, the effective range is determined based on overlap of the correction information corresponding to the outline coordinates.

32. The character processing method according to claim 22, further comprising an effective-range output step of outputting the effective range, wherein at said correction step, the outline coordinates is corrected in accordance with the correction information within the effective range outputted at said effective-range output step.

33. The character processing method according to claim 32, wherein at said effective-range output step, the effective range is outputted in form of array by each of the outline coordinates.

34. The character processing method according to claim 32, wherein at said effective-range output step, the effective range is outputted in form of array by each of the correction information.

35. The character processing method according to claim 32, wherein at said effective-range output step, the effective range is outputted in form of plotting commands.

36. The character processing method according to claim 22, further comprising a character-information reading step of reading character-design information, wherein at said effective-range determination step, the effective range is determined by referring to the character-design information.

37. The character processing method according to claim 36, wherein the character-design information is indicative of coordinates of character design.

38. The character processing method according to claim 36, wherein the character-design information is an initial reference point of character design.

39. The character processing method according to claim 36, wherein the character-design information is character-wind amount of character design.

40. The character processing method according to claim 36, wherein at said effective-range determination step, the effective range is determined based on an amount of movement of the outline coordinates from immediately-previous coordinates.

41. A computer-readable memory holding program codes of character-processing, using outline font that represents a shape of a character with outline coordinates, comprising:

codes of coordinate-reading process for reading the outline coordinates;

codes of effective-range determination process for determining an effective range allowing correction on the outline coordinates, in a plurality of correction information; and codes of correction process for correcting the outline coordinates, in accordance with the correction information within the effective range.

* * * * *

UNITED STATES PATENT AND TRADEMARK OFFICE
CERTIFICATE OF CORRECTION

PATENT NO. : 5,801,712

DATED : September 1, 1998

INVENTOR(S): YASUHIRO KUJIRAI:

It is certified that error appears in the above-identified patent and that said Letters Patent is hereby corrected as shown below:

COLUMN 1

Line 19, "or" should read --of--;
Line 22, "processing" should read --processings--;
Line 66, "foregoing" should read --the foregoing--.

COLUMN 2

Line 37, "line" should read --line---.

COLUMN 5

Line 13, "valves" should read --value is--;
Line 58, "is" should read --are--;
Line 59, "step S9." should read --step S901.---.

COLUMN 6

Line 22, "In initial" should read --Initial--.

COLUMN 11

Line 24, "determines" should read --determine--.

UNITED STATES PATENT AND TRADEMARK OFFICE
CERTIFICATE OF CORRECTION

PATENT NO. : 5,801,712

DATED : September 1, 1998

INVENTOR(S): YASUHIRO KUJIRAI:

It is certified that error appears in the above-identified patent and that said Letters Patent is hereby corrected as shown below:

COLUMN 12

```
Line 9,  "nrange" should read --nrange--;
Line 11, "nrange" should read --nrange--;
Line 21, "count" should read --count--;
Line 54, "count" should read --count--;
Line 63, "count" should read --count--.
```

COLUMN 13

```
Line 3,  "count" should read --count--;
Line 6,  "count" should read --count--;
Line 7,  "count/2" should read --count/2--;
Line 8,  "nrange." should read --nrange.--;
Line 9,  "nrange" should read --nrange--;
Line 44, "hstem" should read --hstem--;
Line 46, "vstem" should read --vstem--;
Line 47, "vstem and hstem," should read --vstem and hstem,--
Line 59, "xrpe" should read --xrpe--;
Line 61, "endglyph" should read --endglyph--;
Line 64, "hmoveto, vmoveto" should read --hmoveto, vmoveto--
Line 65, "rmoveto," should read --rmoveto,--;
Line 66, "closepath" should read --closepath--.
```

UNITED STATES PATENT AND TRADEMARK OFFICE
CERTIFICATE OF CORRECTION

PATENT NO. : 5,801,712

DATED : September 1, 1998

INVENTOR(S): YASUHIRO KUJIRAI:

It is certified that error appears in the above-identified patent and that said Letters Patent is hereby corrected as shown below:

COLUMN 14

Line 5, "(hmoveto, vmoveto" should read
--(hmoveto, vmoveto--;
Line 6, "rmoveto)" should read --rmoveto)--;
Line 7, "(hlineto, vlineto" should read
--(hlineto, vlineto--;
Line 8, "rlineto)," should read --rlineto),--
Line 9, "(hvcurveto, vhcurveto, rrcurveto)," should read
--(hvcurveto, vhcurveto, rrcurveto),--;
Line 37, "endglyph" should read --endglyph--;
Line 57, "it NO" should read --if NO--.

COLUMN 15

Line 21, "of" (second occurrence) should be deleted;
Line 66, "closepath" should read --closepath--.

COLUMN 16

Line 47, "are" should read --being--.

UNITED STATES PATENT AND TRADEMARK OFFICE
CERTIFICATE OF CORRECTION

PATENT NO. : 5,801,712

DATED : September 1, 1998

INVENTOR(S): YASUHIRO KUJIRAI:            Page 4 of 4

It is certified that error appears in the above-identified patent and that said Letters Patent is hereby corrected as shown below:

COLUMN 19

Line 12, "is" should read --are--.

Signed and Sealed this

Thirty-first Day of August, 1999

Attest:

Q. TODD DICKINSON

*Attesting Officer*         *Acting Commissioner of Patents and Trademarks*